United States Patent
Rangachari et al.

(10) Patent No.: US 9,025,705 B2
(45) Date of Patent: May 5, 2015

(54) CURRENT REDUCTION IN DIGITAL CIRCUITS

(71) Applicant: Texas Instruments Incorporated, Dallas, TX (US)

(72) Inventors: Sundarrajan Rangachari, Bangalore (IN); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 34 days.

(21) Appl. No.: 14/046,479

(22) Filed: Oct. 4, 2013

(65) Prior Publication Data

US 2014/0098908 A1    Apr. 10, 2014

(30) Foreign Application Priority Data

Oct. 9, 2012  (IN) .......................... 4200/CHE/2012

(51) Int. Cl.
*H04L 27/08*  (2006.01)
*H04L 25/06*  (2006.01)

(52) U.S. Cl.
CPC .................................. *H04L 25/061* (2013.01)

(58) Field of Classification Search
CPC ................ H04L 25/061; H04L 1/00

USPC ........................................ 375/345, 346, 319
See application file for complete search history.

(56) References Cited

U.S. PATENT DOCUMENTS

| 2007/0177420 A1* | 8/2007 | Guo ............................ 365/158 |
| 2009/0003094 A1* | 1/2009 | Jung ........................... 365/191 |
| 2013/0243147 A1* | 9/2013 | Kim et al. ..................... 377/42 |

* cited by examiner

*Primary Examiner* — Qutbuddin Ghulamali
(74) *Attorney, Agent, or Firm* — Ronald O. Neerings; Frank D. Cimino

(57) ABSTRACT

A digital circuit includes at least one input node, a biasing circuit, and a digital baseband circuit. The input node receives a digital signal including samples at a plurality of sample instances, the samples including a positive sample and a negative sample and represented by first plurality of bits. The biasing circuit generates a biased digital signal by adding a bias value to the digital signal so as to change the positive sample and the negative sample to first sample and second sample respectively and represented by second plurality of bits. The digital baseband circuit is configured to receive and process the biased digital signal such that reduced current consumption is realized based on a number of bit toggles in the second plurality of bits being less than a number of bit toggles in the first plurality of bits.

20 Claims, 6 Drawing Sheets

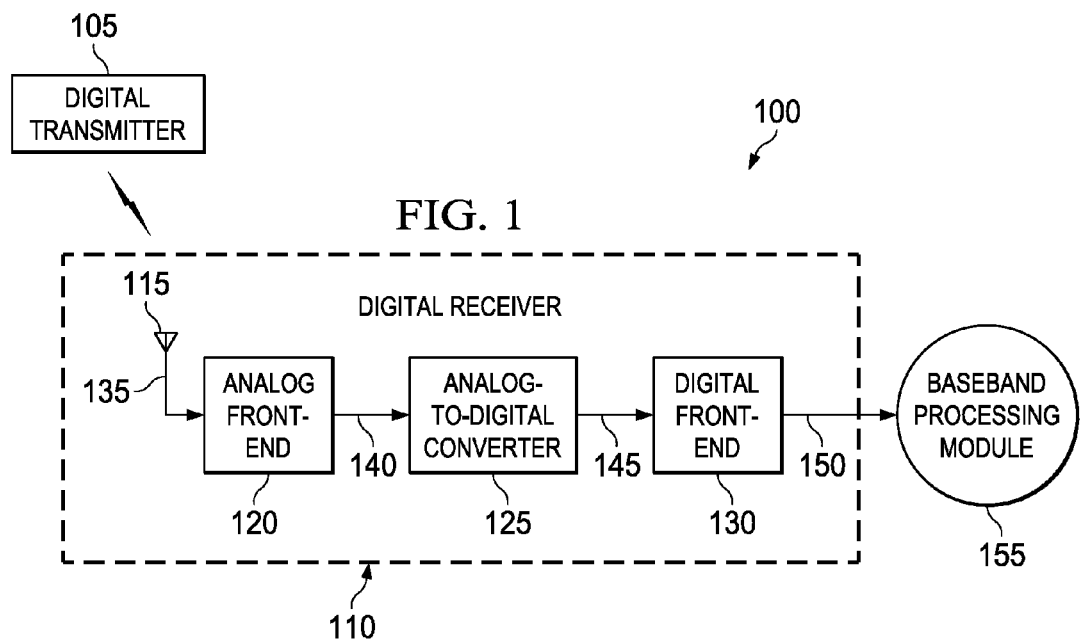
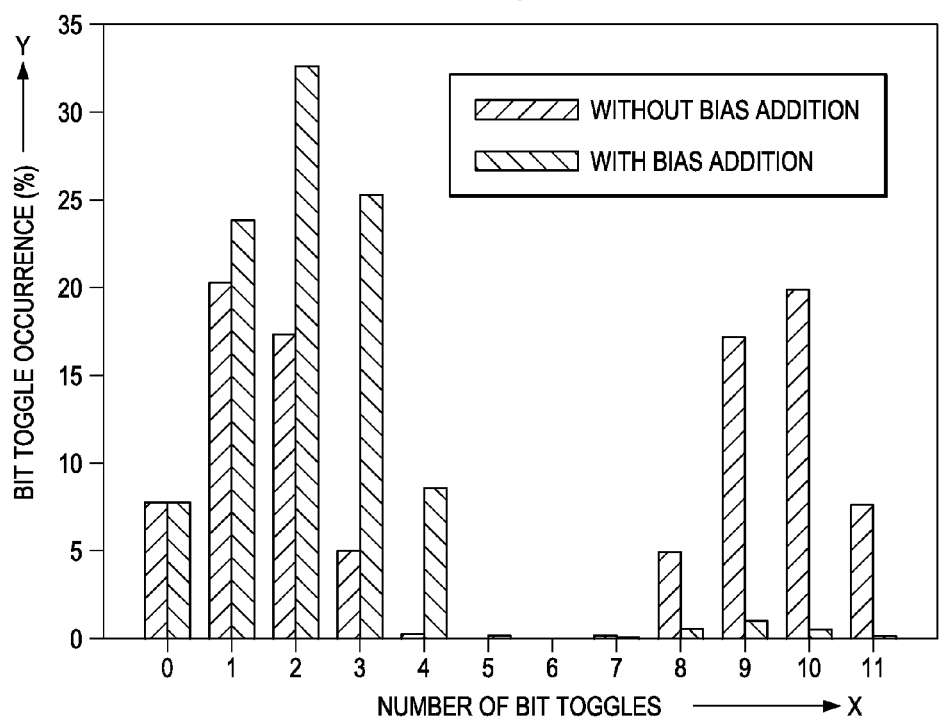

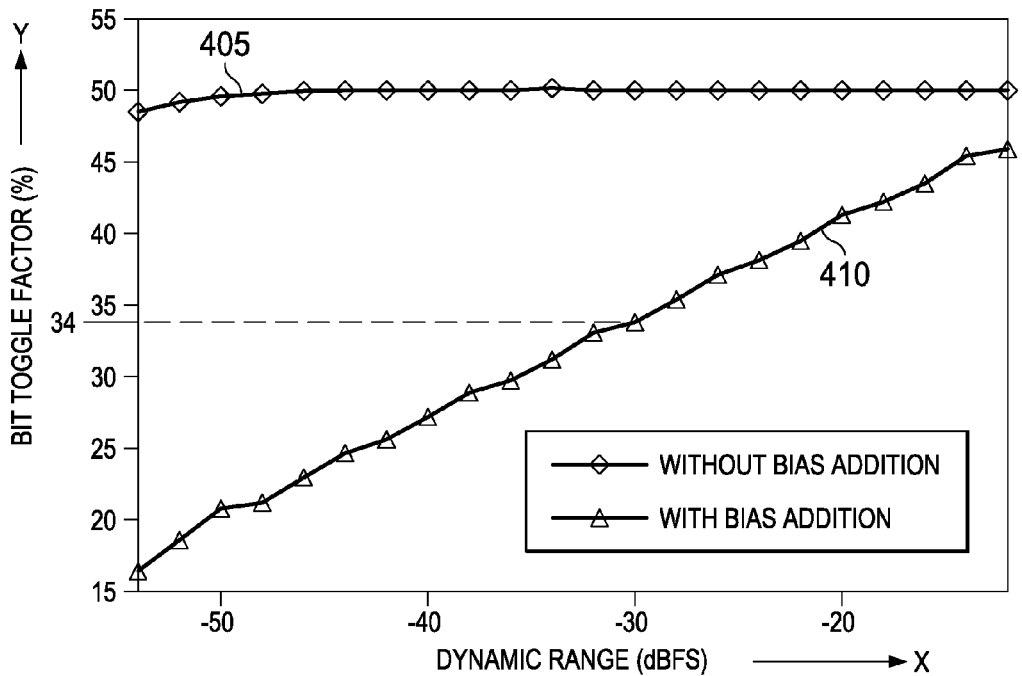
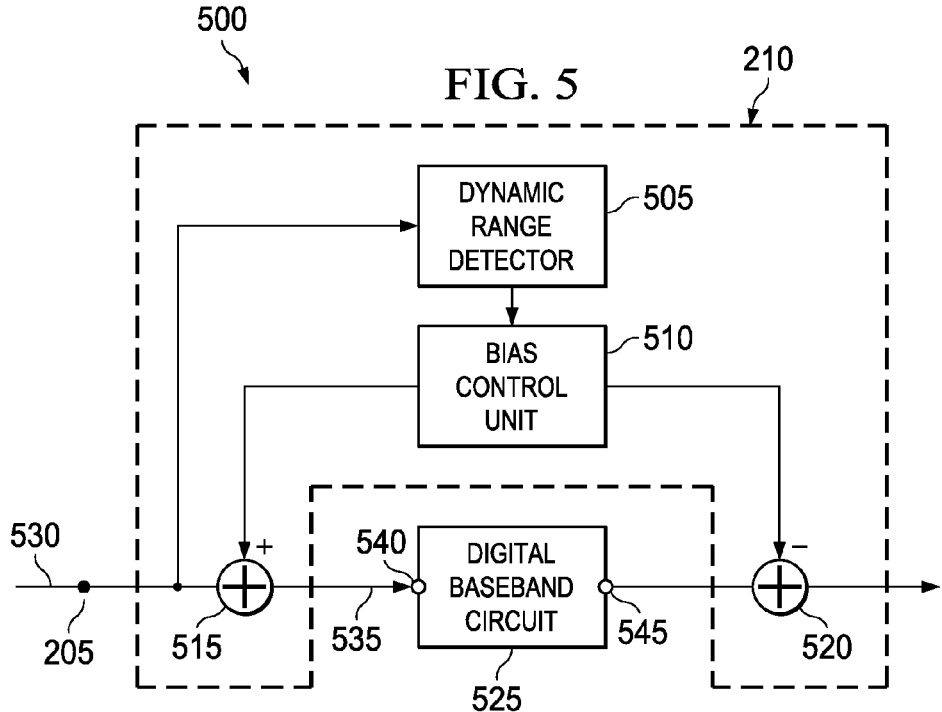

CURRENT REDUCTION IN DIGITAL CIRCUITS

CROSS REFERENCE TO RELATED APPLICATIONS

This application claims the benefit of provisional patent application number "4200/CHE/2012" filed on 9th of Oct. 2012 in the Indian Patent Office, incorporated herein in its entirety.

TECHNICAL FIELD

The present disclosure relates to current reduction in digital circuits.

BACKGROUND

In accordance with an example scenario, communication between electronic devices, for example mobile phones, is performed using transceivers integrated with the electronic devices. Electric current consumption in such transceivers, for example wireless local area network (WLAN) transceivers, is an important operational parameter, since the electric current consumption determines time between consecutive battery recharges, which directly impacts user experience. An example mode of receiver operation is a listen mode of a receiver, in which the electric current consumption is intended to be minimal. During the listen mode, physical layer (PHY) digital modules in the receiver are active for an increased amount of time in order to detect a presence of a data packet, thereby leading to an increase in battery drain. In one example scenario, each of the PHY digital modules is designed for worst case operating conditions. However, the electric current consumption nevertheless remains constant and high.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a digital circuit includes at least one input node positioned to receive a digital signal. The digital signal includes a plurality of samples at a plurality of sample instances. The plurality of samples includes at least a positive sample and a negative sample that are consecutive samples and each of the positive sample and the negative sample are represented by a first plurality of bits. The digital circuit also includes a biasing circuit coupled to the at least one input node. The biasing circuit is configured to generate a biased digital signal by adding a bias value to the digital signal so as to change the positive sample and the negative sample to a first sample and a second sample respectively. Each of the first sample and the second sample are represented by a second plurality of bits. Further, the digital circuit includes a digital baseband circuit coupled to the biasing circuit, configured to receive and process the biased digital signal such that a reduced current consumption is realized by the digital baseband circuit based on a number of bit toggles in the second plurality of bits for a transition between the first sample and the second sample being less than a number of bit toggles in the first plurality of bits for a transition between the positive sample and the negative sample.

Additionally, in an embodiment, a digital front-end of a digital receiver includes at least one input node positioned to receive a digital baseband signal. The digital baseband signal includes a plurality of samples at a plurality of sample instances. The plurality of samples includes at least a positive sample and a negative sample that are consecutive samples and each of the positive sample and the negative sample is represented by a first plurality of bits. The digital front-end also includes a biasing circuit coupled to the at least one input node. The biasing circuit is configured to generate a biased digital baseband signal by adding a bias value to the digital baseband signal so as to change the positive sample and the negative sample to a first sample and a second sample respectively. Each of the first sample and the second sample are represented by a second plurality of bits. Further, the digital front-end includes at least one digital baseband circuit coupled to the biasing circuit, and configured to receive and process the biased digital baseband signal such that a reduced current consumption is realized by the at least one digital baseband circuit based on a number of bit toggles in the second plurality of bits for a transition between the first sample and the second sample being less than a number of bit toggles in the first plurality of bits for a transition between the positive sample and the negative sample.

Moreover, in an embodiment, a method of reducing current consumption in a digital circuit includes receiving a digital signal including a plurality of samples at a plurality of sample instances. The plurality of samples includes at least a positive sample and a negative sample that are consecutive samples and each of the positive sample and the negative sample is represented by a first plurality of bits. The method also includes applying a bias value to the digital signal to generate a biased digital signal so as to change the positive sample and the negative sample to a first sample and a second sample respectively. Each of the first sample and the second sample is represented by a second plurality of bits. The method further includes providing the biased digital signal to at least one digital baseband circuit such that a reduced current consumption is realized by the at least one digital baseband circuit based on a number of bit toggles in the second plurality of bits for a transition between the first sample and the second sample being less than a number of bit toggles in the first plurality of bits for a transition between the positive sample and the negative sample.

BRIEF DESCRIPTION OF THE FIGURES

FIG. 1 illustrates a block diagram of an example environment, in accordance with which various embodiments can be implemented;

FIG. 3 is a graphical representation illustrating an example effect of bias addition on a number of bit toggles in an example digital front-end of a digital receiver, in accordance with one embodiment;

FIG. 4 is a graphical representation illustrating an example effect of bias addition on bit toggle factor and dynamic range of a digital baseband signal in an example digital front-end in a digital receiver, in accordance with one embodiment;

FIG. 5 illustrates a digital circuit employing a first example biasing circuit, in accordance with one embodiment;

DETAILED DESCRIPTION

Figure 2:
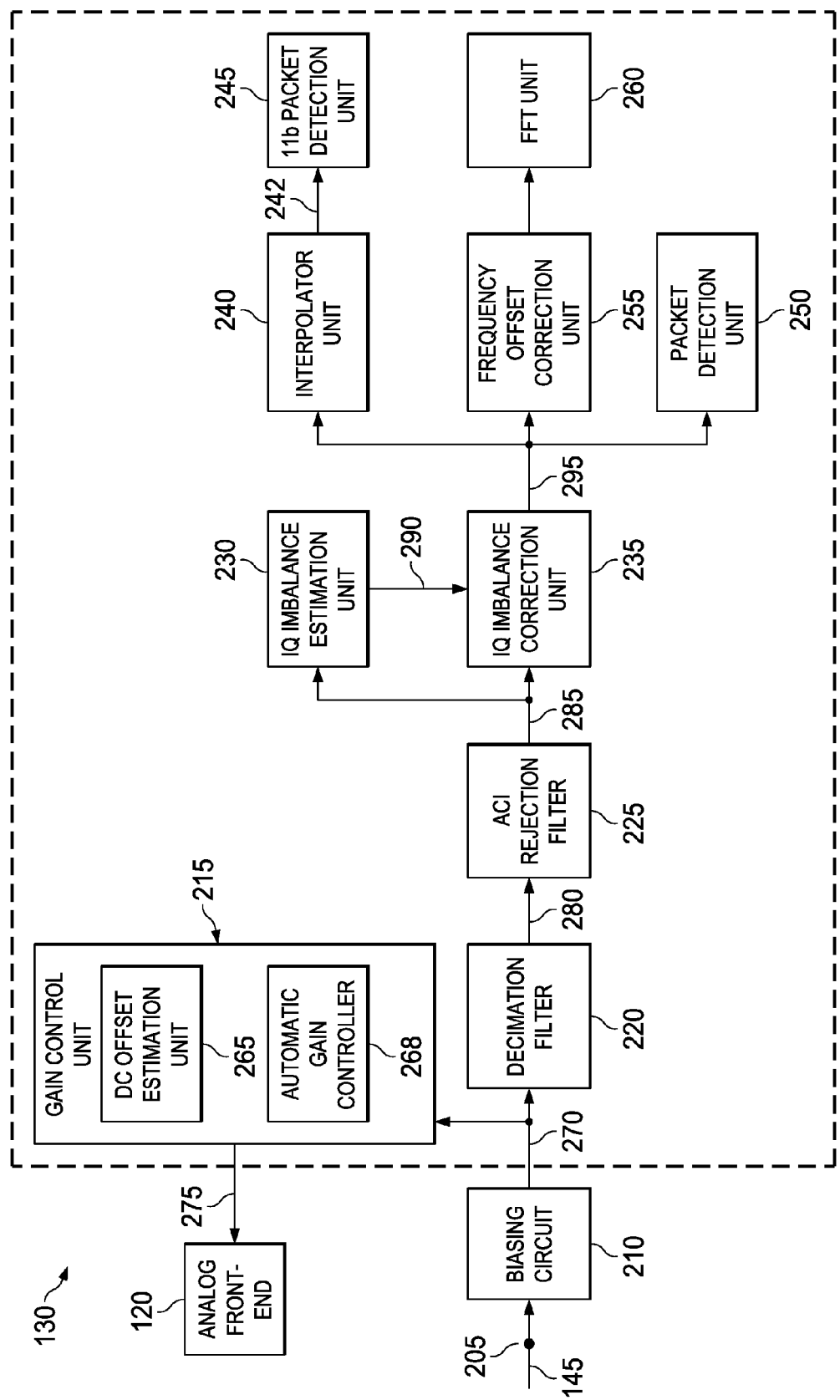
FIG. 2 illustrates a block diagram of an example digital front-end of a digital receiver, in accordance with one embodiment.

FIG. 1 illustrates a block diagram of an example environment 100 representing a communication system. The environment 100 includes a digital transmitter 105 (hereinafter referred to as the transmitter 105), and a digital receiver 110 (hereinafter referred to as the receiver 110). Examples of the receiver 110 include, but are not limited to, a wireless local area network (WLAN) receiver, a Bluetooth receiver, a global positioning system (GPS) receiver, a worldwide interoperability for microwave access (WiMAX) receiver, and a global navigation satellite system (GNSS) receiver. The receiver 110 further includes, but is not limited to, an antenna 115, an analog front-end (AFE) 120, an analog-to-digital converter (ADC) 125, and a digital front-end (DFE) 130. The antenna 115 is operable to receive a signal 135, for example a radio frequency signal, from the transmitter 105 using a communication channel. The AFE 120 processes the signal 135 to generate an analog baseband signal 140. The ADC 125 converts the analog baseband signal 140 to a digital baseband signal 145. The DFE 130 processes the digital baseband signal 145 to provide an output baseband signal 150 that is subjected to further baseband processing in a baseband processing module 155 before being received by a user. Various embodiments of the present technology add a bias value in at least one signal in the DFE 130 to minimize bit toggling in one or more circuit elements in the DFE 130 for reducing overall current consumption in the DFE 130.

An example embodiment of a block diagram of the DFE 130 having reduced current consumption in different modes of the receiver 110 is explained with reference to FIG. 2.

Referring now to FIG. 2, the DFE 130 includes at least one input node, for example an input node 205, a biasing circuit 210 and at least one digital baseband circuit. The at least one digital baseband circuit is also referred to as physical layer (PHY) digital modules. Examples of the at least one digital baseband circuit include a gain control unit 215, a decimation filter 220, an adjacent channel interference (ACI) rejection filter 225, an in-phase and quadrature (IQ) imbalance estimation unit 230, an IQ imbalance correction unit 235, an interpolator unit 240, a 11b packet detection unit 245, a packet detection unit 250, a frequency offset correction unit 255, and a Fast Fourier Transform (FFT) unit 260. The gain control unit 215 further includes a direct current (DC) offset estimation unit 265 and an automatic gain controller (AGC) 268.

Without loss of generality, in the example embodiment of FIG. 2, the biasing circuit 210 is shown as coupled between the input node 205 and the decimation filter 220. The gain control unit 215 is coupled between the biasing circuit 210 and an analog front-end, for example the AFE 120. The decimation filter 220 is coupled between the biasing circuit 210 and the ACI rejection filter 225. The IQ imbalance estimation unit 230 is coupled between the ACI rejection filter 225 and the IQ imbalance correction unit 235. The IQ imbalance correction unit 235 is coupled between the ACI rejection filter 225 and the frequency offset correction unit 255. The interpolator unit 240 is coupled to the IQ imbalance correction unit 235. The 11b packet detection unit 245 is coupled to the interpolator unit 240. The packet detection unit 250 is coupled to the IQ imbalance correction unit 235. The frequency offset correction unit 255 is coupled between the IQ imbalance correction unit 235 and the FFT unit 260.

The input node 205 receives a digital baseband signal 145 from an analog-to-digital converter, for example the ADC 125. The digital baseband signal 145 is either a real signal, a complex signal, or a combination of the real signal and the complex signal. Examples of the digital baseband signal 145 include, but are not limited to, at least one of in-phase (I) and quadrature phase (Q) digital base-band signals. The digital baseband signal 145 includes a plurality of samples at a plurality of sample instances. The plurality of samples are both positive samples and negative samples at various sample intervals. In various scenarios, at two consecutive sample instances, the digital baseband signal 145 transitions between a positive sample and a negative sample or vice versa, for example, between +X to −Y, (where X and Y are natural numbers). Amplitude of the digital baseband signal 145 may have different values at different instances and these values are represented by n number of bits, for example 12 bits. Each of the positive sample and the negative sample is represented by a first plurality of bits. For the sake of the present description, herein, the positive sample and the negative sample of the digital baseband signal 145 refer to two consecutive samples where one sample is less than a reference level, for example zero, and other sample is more than the reference level. The biasing circuit 210 is configured to add a bias value to the digital baseband signal 145 for changing the positive sample to a first sample and the negative sample to a second sample, and generating a biased digital baseband signal 270. Each of the first sample and the second sample is represented by a second plurality of bits. In an example embodiment, each of the first sample and the second sample are positive samples, for example greater than the reference level. In an alternate embodiment, each of the first sample and the second sample are negative samples, for example less than the reference level. In an embodiment, a number of bit toggles in the second plurality of bits for a transition between the first sample and the second sample is less than a number of bit toggles in the first plurality of bits for a transition between the positive sample and the negative sample. It should be noted that as the biased digital baseband signal 270 has less bit toggling between the first sample and the second sample, there will be correspondingly less bit flips in sequential and combinational elements in any digital baseband circuit of the at least one digital baseband circuit operating on the biased digital baseband signal 270, thereby causing a less current consumption.

The at least one digital baseband circuit is configured to receive and process (for example receiving data packets) the biased digital baseband signal 270. In some example embodiments, one or more of subsequent circuits in the at least one digital baseband circuit are modified as the digital baseband signal 145 is modified based on the bias value. The gain control unit 215 and the decimation filter 220 receive the biased digital baseband signal 270 from the biasing circuit 210. The DC offset estimation unit 265 estimates a DC offset in the biased digital baseband signal 270. The AGC 268 generates a gain control signal 275 as a feedback to the AFE 120 in response to the biased digital baseband signal 270. The decimation filter 220 further reduces sampling rate of the biased digital baseband signal 270. The ACI rejection filter 225 receives an output signal 280 of the decimation filter 220 and is operable to provide an ACI filter output signal 285 for filtering out ACI from the output signal 280 of the decimation filter 220. The IQ imbalance estimation unit 230 is responsive to the ACI filter output signal 285 of the ACI rejection filter 225 to generate an imbalance signal 290 for estimating imbalance between I and Q branches of the receiver 110. The IQ imbalance correction unit 235 is responsive to the ACI filter output signal 285 and the imbalance signal 290 to correct the imbalance between the I and Q branches of the receiver 110 and to generate an output signal 295.

The interpolator unit 240 is configured to convert the sampling rate of the output signal 295 to be an integer multiple of a base rate of an IEEE 802.11b packet. The 11b packet detection unit 245 is responsive to an output signal 242 of the interpolator unit 240 to detect 11b packets associated with an 11b signal.

The packet detection unit 250 is configured to detect an orthogonal frequency-division multiplexing (OFDM) packet. The frequency offset correction unit 255 estimates and corrects a frequency offset between the transmitter 105 and the receiver 110. The FFT unit 260 further converts the OFDM packet in time domain to frequency domain.

In one example, the digital baseband signal 145 received at the input node 205 has two consecutive samples as the positive sample of +2 and the negative sample of −3. For a 12 bit digital signal, the positive sample of +2 has a 2's complement binary representation as illustrated in expression (1) and the negative sample of −3 has a 2's complement binary representation as illustrated in expression (2). Expressions (1) and (2) represent the first plurality of bits, for example 12 bits.

$$+2 = 0000\ 0000\ 0010 \quad (1)$$

$$-3 = 1111\ 1111\ 1101 \quad (2)$$

In an embodiment, for minimizing the bit toggling, the bias value of a voltage equivalent to +4 is added by the biasing circuit 210 to the digital baseband signal 145 for changing the positive sample of +2 to the first sample of +6 and the negative sample of −2 to a second sample of +1. The first sample of +6 has a 2's complement binary representation as illustrated in expression (3) and the second sample of +1 has a 2's complement binary representation as illustrated in expression (4). Expressions (3) and (4) represent the second plurality of bits.

$$+6 = 0000\ 0000\ 0110 \quad (3)$$

$$+1 = 0000\ 0000\ 0001 \quad (4)$$

It should be noted from expressions (1) and (2) that there are 12 bit toggles in the first plurality of bits for a transition between +2 and −3. The bit toggles in the first plurality of bits occur mainly in most significant bits (MSBs) due to sign change during the transition between +2 and −3. From expressions (3) and (4), there is at least 3 bit toggles in the second plurality of bits for a transition between +6 and +1. Hence, the number of bit toggles in the second plurality of bits is less than the number of bit toggles in the first plurality of bits on addition of the bias value, thereby reducing current consumption in the sequential and combinational elements of the digital baseband circuit.

In some embodiments, the bias value is a least value that changes the positive sample and the negative sample of the digital baseband signal 145 to positive values of the first sample and the second sample. In other embodiments, the bias value is a value that is $n^{th}$ power of 2, for example $2^1$, $2^2$, $2^3 \ldots 2^{n-1}$ for an n-bit digital baseband signal 145. In yet other embodiments, the bias value is a fixed pre-defined value based on noise bandwidth, noise figure, and gain of the AFE 120.

FIG. 3 is a graphical representation illustrating an example effect of bias addition on a number of bit toggles in the DFE 130 of the receiver 110. In the example representation, X-axis represents the number of bit toggles in the DFE 130 for a 12 bit digital signal and Y-axis represents bit toggle occurrence in percentage (%) for a noise only input scenario received at the DFE 130. In an example histogram as illustrated in FIG. 3, the bit toggle occurrence is determined for corresponding number of bit toggles for a scenario without bias addition and for a scenario with bias addition. The 12 bit digital signal, in one example having a root mean square (RMS) value of −49 decibels relative to full scale (dBFS), is represented with 5 least significant bits (LSBs) (bit 0 to bit 4) and 7 most significant bits (MSBs) (bit 5 to bit 11). For the scenario without bias addition, the bit toggle occurrence is higher for both the LSBs (bit 0 to bit 3) and the MSBs (bit 8 to bit 11). However, for the scenario with bias addition, the bit toggle occurrence is higher for the LSBs (bit 0 to bit 4) and decreases for the MSBs (bit 5 to bit 11).

FIG. 4 is graphical representation illustrating an example effect of bias addition on bit toggle factor and dynamic range of the digital baseband signal 145 in the DFE 130 of the receiver 110. In the example representation, X-axis represents the dynamic range of the 12 bit digital signal (example of the digital baseband signal 145) in dBFS and Y-axis represents the bit toggle factor in percentage (%) for additive white Gaussian noise (AWGN) input scenario of the DFE 130. The bit toggle factor is determined for corresponding dynamic ranges for the scenario without bias addition and for the scenario with bias addition. As illustrated, for the dynamic range of the 12 bit digital signal ranging from −50 dBFS to −20 dBFS, the bit toggle factor ranges from 15% to 45% for the scenario with bias addition and from 48% to 50% for the scenario without bias addition. A waveform 405 indicates the scenario without bias addition where the bit toggle factor is approximately 50% across the dynamic range. A waveform 410 indicates the scenario with bias addition where the bit toggle factor decreases with a decrease in the dynamic range, for example at −30 dBFS the bit toggle factor is 34% and at −50 dBFS the bit toggle factor is 20%.

FIG. 5 illustrates a digital circuit 500, for example the receiver 110, employing a first example biasing circuit, for example the biasing circuit 210. Examples of the digital circuit 500 are one or more digital components of a transmitter, a receiver, a transceiver or other similar digital circuits. For example, the digital circuit 500 includes one or more components of the DFE 130 of the receiver 110. In the example representation shown in FIG. 5, the digital circuit 500 includes the input node 205, the biasing circuit 210, and a digital baseband circuit 525. The biasing circuit 210 includes a dynamic range detector 505, a bias control unit 510, an input adder 515, and an output adder 520. In some embodiments, the biasing circuit 210 includes only the input adder 515, and one or all of the dynamic range detector 505, the bias control unit 510, and the output adder 520 need not to be present. In some embodiments, the AGC 268 is used as the dynamic range detector 505. The biasing circuit 210 is used with the digital baseband circuit 525.

The dynamic range detector 505 is coupled to the input node 205 to receive a digital signal 530 (for example, the digital baseband signal 145). The dynamic range detector 505 is configured to provide a signal representative of the dynamic range of the digital signal 530 to the bias control unit 510. An input of the input adder 515 is coupled to the input node 205 to receive the digital signal 530 and another input of the input adder 515 is coupled to the bias control unit 510 for receiving a bias value provided by the bias control unit 510. An output of the input adder 515 (for example, a biased digital signal 535) is coupled to the digital baseband circuit 525. The output adder 520 is coupled to the bias control unit 510 to receive a compensation bias value and is configured to add the compensation bias value at an output signal of the digital baseband circuit 525. This compensates the effect of the bias value present in the biased digital signal 535 on the output signal of the digital baseband circuit 525. In some embodiments, the compensation bias value is added based on a value selected from a look-up table (LUT) that includes a plurality of bias values and corresponding compensation bias values.

In the embodiment shown in FIG. 5, the dynamic range detector 505 detects the dynamic range of the digital signal 530 (for example the digital baseband signal 145), for multiple signal conditions. Examples of the signal conditions include, but are not limited to, a noise only input scenario, a low power signal, and a high power signal. The dynamic range is periodically or non-periodically estimated at the input node 205 using RMS value, mean absolute value, peak absolute value, or by determining number of MSB sign extensions of the digital signal 530. The bias control unit 510 is configured to generate the bias value based on the dynamic range of the digital signal 530. The input adder 515 adds the bias value to the digital signal 530 and provides the biased digital signal 535 to an input node 540 of the digital baseband circuit 525. The output adder 520 is configured to provide the compensation bias value to the output signal received from an output node 545 of the digital baseband circuit 525. Bias compensation is provided to mitigate an effect of addition of the bias value on subsequent circuits.

In an example embodiment, the digital baseband circuit 525 is a circuit element of the at least one digital baseband circuit described in reference with FIG. 2. For instance, an example of the digital baseband circuit 525 is the decimation filter 220, the DC offset estimation unit 265, the AGC 268, the ACI rejection filter 225, or the interpolator unit 240. For example, in this embodiment, the biasing circuit 210 is coupled between the input node 540 and the output node 545 of a circuit element, for example the ACI rejection filter 225. The dynamic range detector 505 is operable to detect the dynamic range of an input signal (for example, the output signal 280 of the decimation filter 220) received at the ACI rejection filter 225. The bias control unit 510 is configured to generate the bias value based on the dynamic range of the input signal and the bias value is fed to the input adder 515. The input adder 515 provides the biased digital signal 535 to the input node 540 of the ACI rejection filter 225. Further, the output adder 520 is configured to provide the compensation bias value at the output node 545 of the ACI rejection filter 225 to mitigate effect of addition of the bias value in the biased digital signal 535. In another example embodiment, the digital baseband circuit 525 is a combination of one or more circuit elements, for example the decimation filter 220, the DC offset estimation unit 265, the AGC 268, the ACI rejection filter 225 and the interpolator unit 240.

Figure 6:
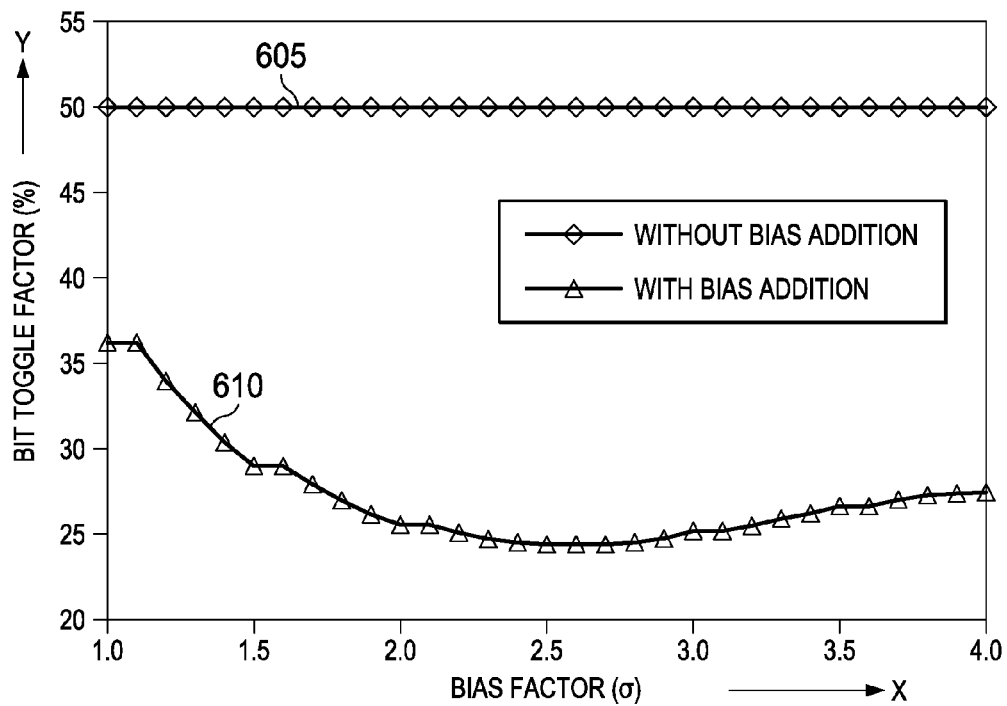
FIG. 6 is a graphical representation illustrating an example effect of bias addition on a bit toggle factor and a bias factor in a digital front-end of a digital receiver, in accordance with one embodiment.

FIG. 6 is a graphical representation illustrating an example effect of bias addition on the bit toggle factor and a bias factor in the DFE 130 of the receiver 110 according to an example embodiment. In this example representation, X-axis represents the bias factor of the 12 bit digital signal as a factor of input signal standard deviation ($\sigma$) ranging from $1.0\sigma$ to $4.0\sigma$ and Y-axis represents the bit toggle factor in percentage (%) ranging from 20% to 50% for the noise only input scenario. The bit toggle factor is determined for corresponding bias factors for the scenario without bias addition and for the scenario with bias addition. As illustrated, for the bias factor ranging from $1\sigma$ to $4\sigma$, the bit toggle factor ranges from 24% to 36% for the scenario with bias addition and is 50% for the scenario without bias addition. A waveform 605 indicates the scenario without bias addition where the bit toggle factor is at an increased level of 50%. A waveform 610 indicates the scenario with bias addition where the bit toggle factor decreases when the bias factor is optimized to range between $1.75\sigma$ and $3.5\sigma$.

Figure 7:
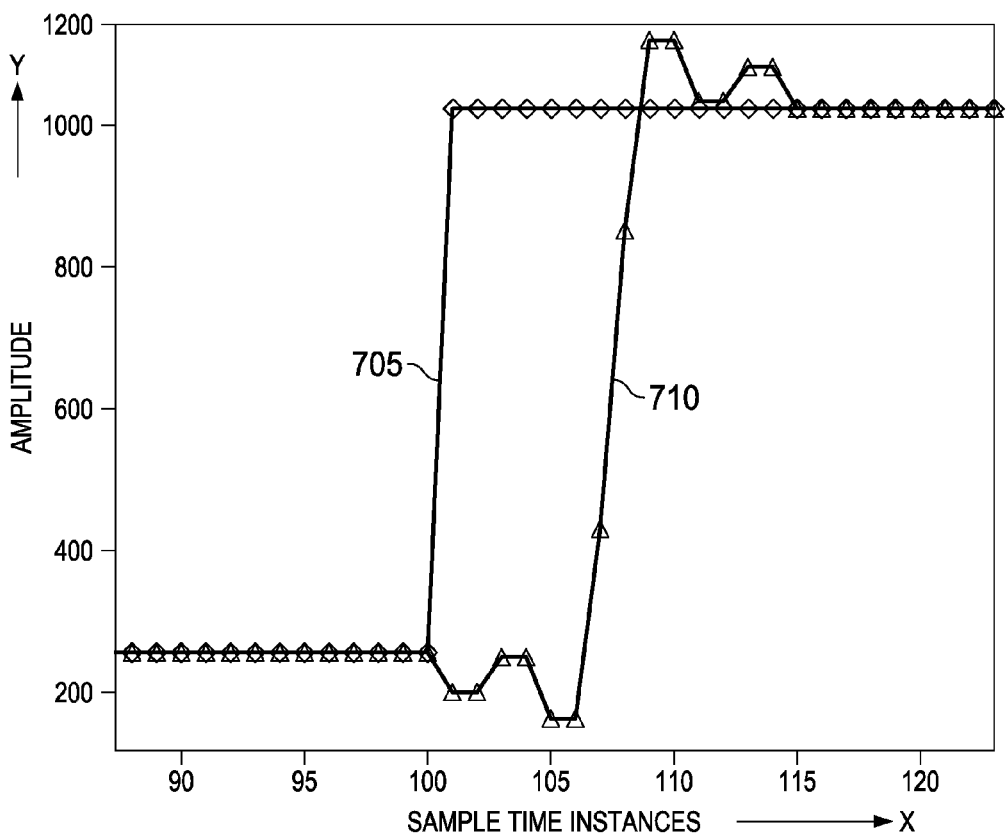
FIG. 7 is a graphical representation illustrating an example effect of bias compensation on an output of at least one example digital baseband circuit, in accordance with one embodiment.

FIG. 7 is a graphical representation illustrating an example effect of the bias compensation on output of at least one example digital baseband circuit, for example the decimation filter 220. The bias compensation for the decimation filter 220 is time synchronized between input and output by using a LUT based method and accounting for response of the decimation filter 220. In the LUT based method, the bias value at the output for each change of the bias value at the input is pre-computed, stored in the LUT, and subtracted when the bias value at the input changes. X-axis represents sample time instances of the biased digital baseband signal (270 or 535) and Y-axis represents amplitude of the biased digital baseband signal (270 or 535). A waveform 705 is indicative of the bias value added in the biased digital baseband signal (270 or 535) having a step change in the bias value from $2^8$ to $2^{10}$ added at the input of the decimation filter 220. A waveform 710 is indicative of the compensation bias value added at the output signal of the decimation filter 220 for the bias compensation for the decimation filter 220. The compensation bias value is added based on a value selected from the LUT that includes the plurality of bias values and the corresponding compensation bias values.

Figure 8:
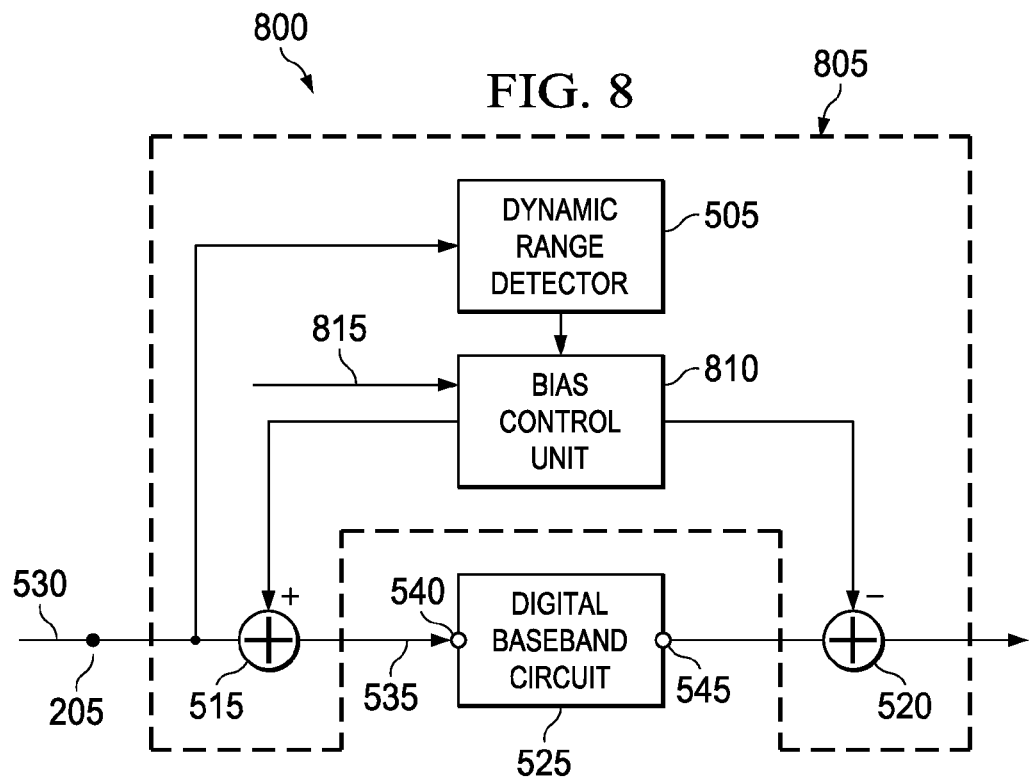
FIG. 8 illustrates a digital circuit employing a second example biasing circuit, in accordance with one embodiment.

FIG. 8 illustrates a digital circuit 800, for example the receiver 110, employing a second example biasing circuit, for example the biasing circuit 805. Examples of the digital circuit 800 include one or more digital components of a transmitter, a receiver, a transceiver or other similar digital circuits. For example, the digital circuit 800 includes one or more components of the DFE 130 of the receiver 110. In the example representation shown in FIG. 8, the digital circuit 800 includes the input node 205, the biasing circuit 805, and a digital baseband circuit 525. The biasing circuit 805 includes the dynamic range detector 505, a bias control unit 810, the input adder 515, and the output adder 520. In some embodiments, the AGC 268 is used as the dynamic range detector 505. The biasing circuit 805 is used with the digital baseband circuit 525. For example, the biasing circuit 805 is connected between the input node 540 and the output node 545 of the digital baseband circuit 525 such as the decimation filter 220, the DC offset estimation unit 265, the AGC 268, the ACI rejection filter 225 or the interpolator unit 240.

The dynamic range detector 505 detects the dynamic range of the digital signal 530. The bias control unit 810 is an example of the bias control unit 510 as described in reference with FIG. 5. The bias control unit 810 is configured to generate the bias value based on the dynamic range of the digital signal 530 and based on a synchronization signal 815 representative of a guard interval (GI) portion received at an input of the bias control unit 810. The synchronization signal 815 indicates reception of the GI portion of an OFDM symbol. In an embodiment, the synchronization signal 815 is received from the packet detection unit 250. The input adder 515 adds the bias value to the digital signal 530 and provides the biased digital signal 535 to the input node 540 of the digital baseband circuit 525. The output adder 520 is configured to provide bias compensation to the output signal received from the output node 545 of the digital baseband circuit 525. It should be noted that in this embodiment, the bias value is dynamically changed by the bias control unit 810 to be added by the input adder 515 (and the compensation bias value is added at the output adder 520) during the GI portion of the OFDM symbol based on a knowledge of the synchronization signal 815.

Figure 9:
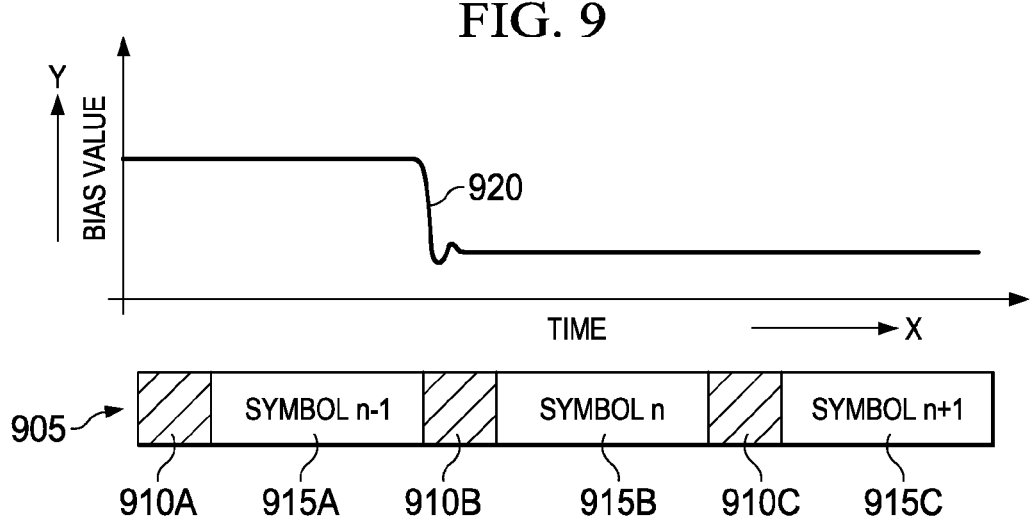
FIG. 9 is a graphical representation illustrating an example synchronization of dynamic bias addition to a guard interval portion of an orthogonal frequency-division multiplexing symbol, in accordance with one embodiment.

It should further be noted that as samples in the guard interval are discarded in an OFDM system, any transient effect in the digital baseband circuit 525 due to a variation in the added bias value is precluded. An example graphical representation of synchronization of dynamic bias addition to the GI portion of the OFDM symbol is shown in FIG. 9. In this example representation, X-axis represents time and Y-axis represents the bias value for an OFDM frame 905. The OFDM frame 905 includes one or more GI portions, for example GI 910A, GI 910B, and GI 910C, for a plurality of OFDM symbols respectively, for example symbol (n−1) 915A, symbol (n) 915B, and symbol (n+1) 915C. A waveform 920 indicates change in the bias value with respect to the time. As illustrated, dynamic change in the bias value is synchronized to the GI portion of the OFDM symbol, for example to the GI portion 910B of symbol (n) 915B. Samples in the GI portion of the OFDM symbol are discarded at input of the FFT unit 260. Hence, by synchronizing the dynamic change in the bias value to the guard interval portion, transient effects due to the dynamic change in the bias value at input of the at least one digital baseband circuit would have no impact on performance of the receiver 110.

In some embodiments, a constant bias value in each OFDM symbol is removed at output of a preceding digital baseband circuit, at the input of the FFT unit 260, or at output of the FFT unit 260.

Figure 10:
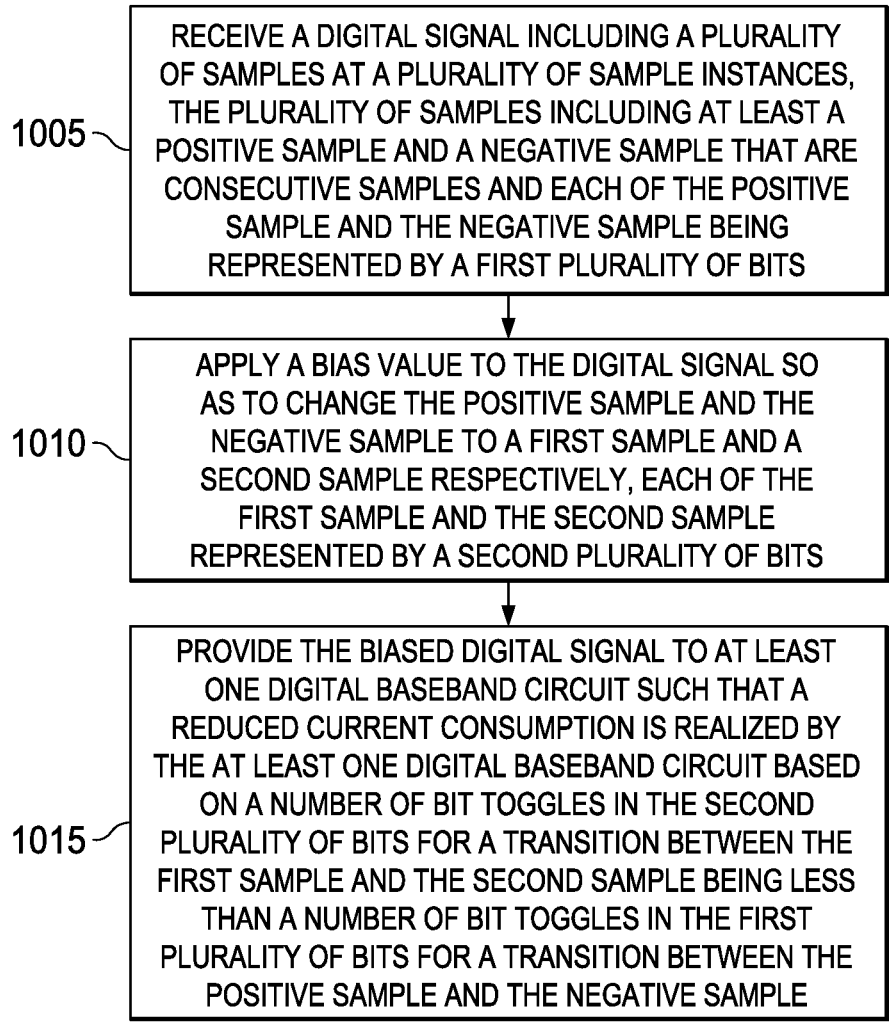
FIG. 10 is a flow diagram illustrating an example method of reducing current consumption in a digital circuit, in accordance with one embodiment.

FIG. 10 is a flow diagram illustrating an example method of reducing current consumption in a digital circuit, for example one or more digital components of the receiver 110. In some embodiments, the digital circuit includes one or more digital components of a digital transmitter, a digital transceiver, or other similar digital circuits. Examples of the digital circuit includes, but is not limited to, one or more digital components in a wireless local area network (WLAN) receiver, a WLAN transmitter, a Bluetooth receiver, a Bluetooth transmitter, a global positioning system (UPS) receiver, a GPS transmitter, a worldwide interoperability for microwave access (WiMAX) receiver, a WiMAX transmitter, a global navigation satellite system (GNSS) receiver, and a GNSS transmitter. In another example, an example of the digital circuit is a digital circuit 500 as explained with reference to FIG. 5.

At block 1005, a digital signal, for example a digital baseband signal, including a plurality of samples at a plurality of sample instances is received at an input node, for example the input node 205. In some example scenarios, the plurality of samples includes a positive sample and a negative sample that are consecutive samples. Each of the positive sample and the negative sample is represented by a first plurality of bits.

At block 1010, a bias value is applied (for example, added) to the digital signal to generate a biased digital signal so as to change the positive sample and the negative sample to a first sample and a second sample respectively. Each of the first sample and the second sample is represented by a second plurality of bits.

In some embodiments, the bias value is added to the digital signal by the biasing circuit, for example the biasing circuit 210. Dynamic range of the digital signal is first detected using a dynamic range detector, for example the dynamic range detector 505. The bias value is then generated based on the dynamic range using a bias control unit, for example the bias control unit 510. A compensation bias value is also generated based on the bias value. The bias value is further added to the digital signal to generate the biased digital signal using an input adder, for example the input adder 515. The biased digital signal is provided to input of the at least one digital baseband circuit. Further, bias compensation is provided by adding the compensation bias value at output of the at least one digital baseband circuit using an output adder, for example the output adder 520.

In some embodiments, the bias compensation is provided by selecting a value from a look-up table. The look-up table includes a plurality of bias values and corresponding compensation bias values to time synchronize input and output of the at least one digital baseband circuit. In other embodiments, the bias compensation is provided based on a synchronization signal by synchronizing the bias value to a guard interval portion of an orthogonal frequency-division multiplexing (OFDM) symbol in an OFDM packet.

At block 1015, the biased digital signal is provided to the at least one digital baseband circuit. The biased digital signal is provided to the at least one digital baseband circuit such that a reduced current consumption is realized by the at least one digital baseband circuit based on a number of bit toggles in the second plurality of bits for a transition between the first sample and the second sample being less than a number of bit toggles in the first plurality of bits for a transition between the positive sample and the negative sample.

In some embodiments, the biased digital signal is processed by the at least one digital baseband circuit. The biased digital signal is used to control an analog front-end (AFE), for example the AFE 120, using a gain control unit, for example the gain control unit 215. Sampling rate of the biased digital signal is also reduced by a decimation filter, for example the decimation filter 220. Adjacent channel interference (ACI) is filtered out from an output signal of the decimation filter using an ACI rejection filter, for example the ACI rejection filter 225. Further, imbalance between in-phase (I) and quadrature (Q) branches of the digital circuit is estimated and corrected using an IQ imbalance estimation unit and an IQ imbalance correction unit, for example the IQ imbalance estimation unit 230 and an IQ imbalance correction unit 235.

In some embodiments, the biased digital signal controls the AFE by estimating a direct current (DC) offset in the biased digital signal using a DC offset estimation unit, for example the DC offset estimation unit 265, and by generating a gain control signal for the AFE in response to the biased digital signal using an automatic gain controller (AGC), for example the AGC 268.

In the digital circuit, the OFDM packet is detected by a packet detection unit, for example the packet detection unit 250. A frequency offset between a transmitter and a receiver, for example the transmitter 105 and the receiver 110, is estimated and corrected by a frequency offset correction unit, for example the frequency offset correction unit 255. The OFDM packet in time domain is then converted to frequency domain by a Fast Fourier Transform (FFT) unit, for example the FFT unit 260.

In the digital circuit, sampling rate of an incoming signal, for example the output signal 295, is converted to be equal to an integer multiple of a base rate required for an IEEE 802.11b packet by an interpolator unit, for example the interpolator unit 240. The IEEE 802.11b packet is detected by a 11b packet detection unit, for example the 11b packet detection unit 245.

Without in any way limiting the scope, interpretation, or application of the claims appearing below, effects of one or more of the example embodiments disclosed herein is to provide a digital front-end of a digital circuit capable of reducing current consumption in one or more PHY digital modules of the digital front-end. The digital front-end utilizes a biasing circuit for adding a bias value which minimizes bit toggling in the digital circuit. The bias value added to a digital signal is dynamically varied in accordance with an input dynamic range to enable current reduction of the digital circuit.

It should be noted that the various circuit elements such as example the decimation filter 220, the DC offset estimation unit 265, the AGC 268, the ACI rejection fitter 225 and the interpolator unit 240 and other elements shown in FIGS. 1, 2 and 5 are for example purposes only, and these circuit elements are configured in a variety of other ways, such as by utilizing a specific circuit element or combinations of circuit elements such as amplifiers, diodes, capacitors, resistors, and the like. Typically, these circuit elements are implemented as interconnections of electronic elements and circuits, and modules such as an Application Specific Integrated Circuit (ASIC), a Field Programmable Gate Array (FPGA), and the like.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification but do not necessarily, refer to the same embodiment.

Various embodiments of the present disclosure, as discussed above, are practiced with steps and/or operations in a different order, and/or with hardware elements in configurations which are different than those which are disclosed. Therefore, although the technology has been described based upon these example embodiments, it is noted that certain modifications, variations, and alternative constructions are apparent and well within the spirit and scope of the technology.

Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A digital circuit, comprising:
   at least one input node positioned to receive a digital signal comprising a plurality of samples at a plurality of sample instances, the plurality of samples comprising at least a positive sample and a negative sample that are consecutive samples and each of the positive sample and the negative sample being represented by a first plurality of bits;
   a biasing circuit coupled to the at least one input node, the biasing circuit configured to generate a biased digital signal by adding a bias value to the digital signal so as to change the positive sample and the negative sample to a first sample and a second sample respectively, each of the first sample and the second sample being represented by a second plurality of bits; and
   a digital baseband circuit coupled to the biasing circuit, configured to receive and process the biased digital signal such that a reduced current consumption is realized by the digital baseband circuit based on a number of bit toggles in the second plurality of bits for a transition between the first sample and the second sample being less than a number of bit toggles in the first plurality of bits for a transition between the positive sample and the negative sample.

2. The digital circuit as claimed in claim 1, wherein the biasing circuit comprises:
   a dynamic range detector that detects a dynamic range of the digital signal;
   a bias control unit coupled to the dynamic range detector, the bias control unit configured to generate the bias value based on the dynamic range of the digital signal, and configured to generate a compensation bias value based on the bias value;
   an input adder coupled to the bias control unit, the input adder configured to add the bias value to the digital signal and to provide the biased digital signal to the digital baseband circuit; and
   an output adder coupled to the digital baseband circuit and the bias control unit, the output adder configured to add the compensation bias value to an output of the digital baseband circuit for bias compensation.

3. The digital circuit as claimed in claim 2, wherein the compensation bias value is generated based on a value selected from a look-up table, wherein the look-up table comprises a plurality of bias values and corresponding compensation bias values.

4. The digital circuit as claimed in claim 2, wherein the bias control unit is configured to generate the bias value based on a synchronization signal representative of a guard interval portion of an orthogonal frequency-division multiplexing (OFDM) symbol in an OFDM packet.

5. The digital circuit as claimed in claim 2, wherein the digital baseband circuit comprises a decimation filter to reduce sampling rate of the biased digital signal.

6. The digital circuit as claimed in claim 2, wherein the digital baseband circuit comprises a direct current (DC) offset estimation unit coupled to the biasing circuit, the DC offset estimation unit configured to estimate a DC offset in the biased digital signal.

7. The digital circuit as claimed in claim 2, wherein the digital baseband circuit comprises an automatic gain controller (AGC) coupled to the biasing circuit, the AGC configured to generate a gain control signal for an analog front-end in response to the biased digital signal.

8. The digital circuit as claimed in claim 2, wherein the digital baseband circuit comprises an adjacent channel interference (ACI) rejection filter coupled to a decimation filter for receiving an output signal from the decimation filter, the ACI rejection filter operable to provide an ACI filter output signal for filtering out ACI from the output signal received from the decimation filter.

9. The digital circuit as claimed in claim 2, wherein the digital baseband circuit comprises an interpolator unit configured to convert a sampling rate of an output signal of an in-phase and quadrature (IQ) imbalance correction unit to be equal to an integer multiple of a base rate required to detect an IEEE 802.11b packet.

10. A digital front-end of a digital receiver, the digital front-end comprising:
    at least one input node positioned to receive a digital baseband signal comprising a plurality of samples at a plurality of sample instances, the plurality of samples comprising at least a positive sample and a negative sample that are consecutive samples and each of the positive sample and the negative sample being represented by a first plurality of bits;
    a biasing circuit coupled to the at least one input node, the biasing circuit configured to generate a biased digital baseband signal by adding a bias value to the digital baseband signal so as to change the positive sample and the negative sample into a first sample and a second sample respectively, each of the first sample and the second sample being represented by a second plurality of bits; and at least one digital baseband circuit coupled to the biasing circuit, configured to receive and process the biased digital baseband signal such that a reduced current consumption is realized by the at least one digital baseband circuit based on a number of bit toggles in the second plurality of bits for a transition between the first sample and the second sample being less than a number of bit toggles in the first plurality of hits for a transition between the positive sample and the negative sample.

11. The digital front-end as claimed in claim 10, wherein the biasing circuit comprises:

a dynamic range detector that detects a dynamic range of the digital baseband signal;

a bias control unit coupled to the dynamic range detector, the bias control unit configured to generate the bias value based on the dynamic range of the digital baseband signal and configured to generate a compensation bias value based on the bias value;

an input adder coupled to the bias control unit, the input adder configured to add the bias value to the digital baseband signal; and an output adder coupled to the at least one digital baseband circuit and the bias control unit, the output adder configured to add the compensation bias value at an output node of the at least one digital baseband circuit for bias compensation.

12. The digital front-end as claimed in claim 10, wherein the at least one digital baseband circuit comprises:

a decimation filter coupled to the biasing circuit, the decimation filter configured to reduce sampling rate of the biased digital baseband signal;

an adjacent channel interference (ACI) rejection filter coupled to the decimation filter for receiving an output signal of the decimation filter, the ACI rejection filter operable to provide an ACI filter output signal for filtering out ACI from the output signal received from the decimation filter;

an in-phase and quadrature (IQ) imbalance estimation unit coupled to the ACI rejection filter, the IQ imbalance estimation unit responsive to the ACI filter output signal to generate an imbalance signal for estimating imbalance between in-phase (I) and quadrature (Q) branches of the digital receiver; and an IQ imbalance correction unit coupled to the ACI rejection filter and the IQ imbalance estimation unit, the IQ imbalance correction unit responsive to the ACI filter output signal and the imbalance signal to correct the imbalance between the I and Q branches of the digital receiver.

13. The digital front-end as claimed in claim 12, wherein the at least one digital baseband circuit further comprises:

a gain control unit coupled to the biasing circuit, the gain control unit configured to control an analog front-end in response to the biased digital baseband signal, the gain control unit comprising:

a direct current (DC) offset estimation unit coupled to the biasing circuit, the DC offset estimation unit configured to estimate a DC offset in the biased digital baseband signal; and an automatic gain controller (AGC) coupled to the biasing circuit, the AGC configured to generate a gain control signal for the analog front-end in response to the biased digital baseband signal.

14. The digital front-end as claimed in claim 12, further comprising:

a packet detection unit coupled to the IQ imbalance correction unit, the packet detection unit configured to detect an orthogonal frequency-division multiplexing (OFDM) packet; and a frequency offset correction unit coupled to the IQ imbalance correction unit, the frequency offset correction unit configured to correct a frequency offset between a transmitter and the digital receiver.

15. The digital front-end as claimed in claim 12, wherein the at least one digital baseband circuit further comprises:

an interpolator unit coupled to the IQ imbalance correction unit, the interpolator unit configured to convert a sampling rate of an output signal of the IQ imbalance correction unit to be equal to an integer multiple of a base rate required to detect an IEEE 802.11b packet; and a 11b packet detection unit coupled to the interpolator unit and responsive to an output signal of the interpolator unit to detect packets associated with a IEEE 802.11b signal.

16. A method of reducing current consumption in a digital circuit, the method comprising:

receiving a digital signal comprising a plurality of samples at a plurality of sample instances, the plurality of samples comprising at least a positive sample and a negative sample that are consecutive samples and each of the positive sample and the negative sample being represented by a first plurality of bits;

applying a bias value to the digital signal to generate a biased digital signal so as to change the positive sample and the negative sample to a first sample and a second sample respectively, each of the first sample and the second sample represented by a second plurality of bits; and providing the biased digital signal to at least one digital baseband circuit such that a reduced current consumption is realized by the at least one digital baseband circuit based on a number of bit toggles in the second plurality of bits for a transition between the first sample and the second sample being less than a number of hit toggles in the first plurality of bits for a transition between the positive sample and the negative sample.

17. The method as claimed in claim 16, wherein applying the bias value to the digital signal comprises:

detecting a dynamic range of the digital signal;

generating the bias value based on the dynamic range of the digital signal and generating a compensation bias value based on the bias value;

adding the bias value to the digital signal to generate the biased digital signal;

providing the biased digital signal to an input of the at least one digital baseband circuit; and adding the compensation bias value at an output of the at least one digital baseband circuit for bias compensation.

18. The method as claimed in claim 17, wherein adding the compensation bias value further comprises:

selecting a value from a look-up table, the look-up table comprising a plurality of bias values and corresponding compensation bias values.

19. The method as claimed in claim 17, wherein the bias value is added based on a synchronization signal representative of a guard interval portion of an orthogonal frequency-division multiplexing (OFDM) symbol in an OFDM packet.

20. The method as claimed in claim 16, further comprising performing at least one of:

controlling an analog front-end in response to the biased digital signal, wherein controlling the analog front-end further comprises:
  estimating a direct current (DC) offset in the biased digital signal; and
  generating a gain control signal for the analog front-end in response to the biased digital signal;
reducing sampling rate of the biased digital signal in a decimation filter;
filtering out adjacent channel interference from an output signal of the decimation filter;
estimating imbalance between in-phase (I) and quadrature (Q) branches of the digital circuit;
correcting the imbalance between the I and Q branches of the digital circuit;
detecting an orthogonal frequency-division multiplexing (OFDM) packet;
correcting a frequency offset between a digital transmitter and a digital receiver;
converting the OFDM packet in time domain to frequency domain; and
converting sampling rate of an output signal of the IQ imbalance correction unit to be equal to an integer multiple of a base rate required for detecting an IEEE 802.11b packet.

* * * * *